Aug. 2, 1960
W. M. HAMMOND, JR
2,947,495
AIR VEHICLE
Filed June 1, 1956
2 Sheets-Sheet 1
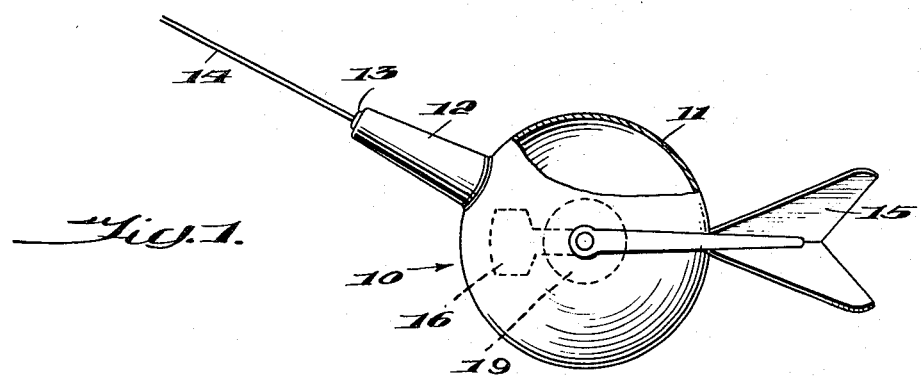
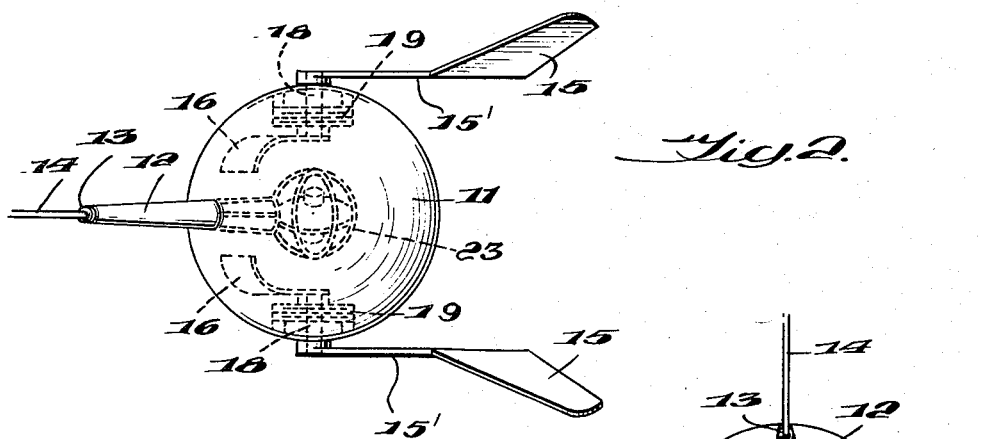
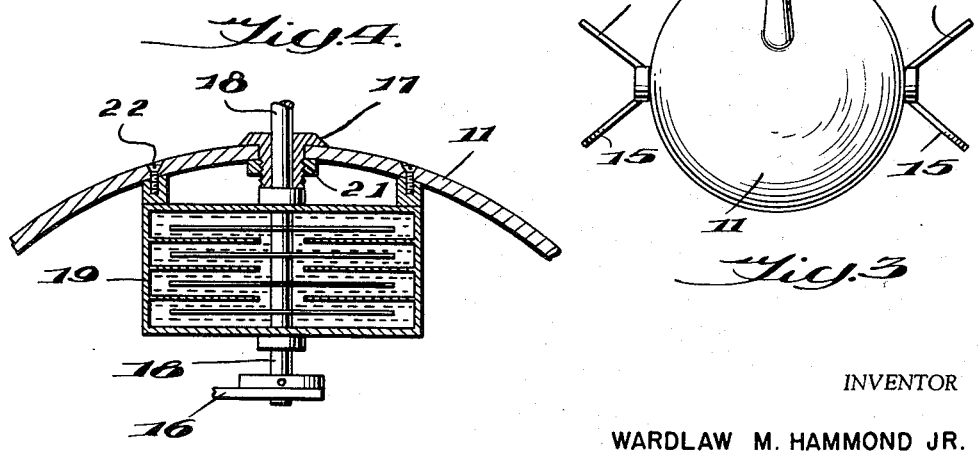
INVENTOR
WARDLAW M. HAMMOND JR.
BY
*Julian C. Renfro*
ATTORNEY Aug. 2, 1960 W. M. HAMMOND, JR 2,947,495
AIR VEHICLE
Filed June 1, 1956 2 Sheets-Sheet 2
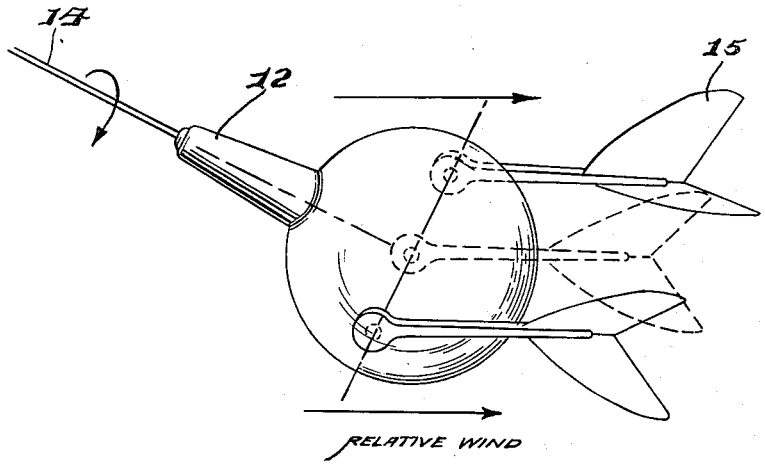
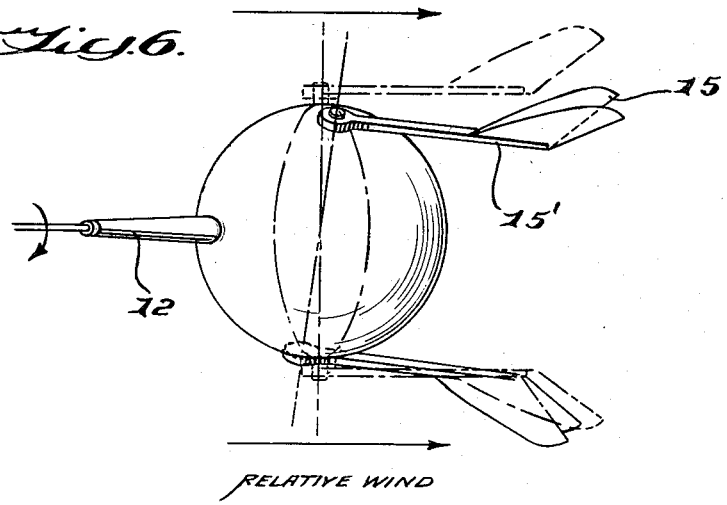
INVENTOR
WARDLAW M. HAMMOND JR.
BY
ATTORNEY

United States Patent Office 2,947,495
Patented Aug. 2, 1960

2,947,495

AIR VEHICLE

Wardlaw M. Hammond, Jr., Baltimore, Md., assignor to The Martin Company, Middle River, Md., a corporation of Maryland Filed June 1, 1956, Ser. No. 588,715

10 Claims. (Cl. 244—3)

This invention relates to an air-towed vehicle designed to be towed behind an aircraft, and more particularly to a stabilized, medium drag, zero lift vehicle for carrying detection instrumentation at a sufficiently great distance behind the aircraft that the instrument will be effectively isolated from undesirable disturbances emanating from the aircraft.

An air-towed vehicle, in order to be suitable for carrying a sensitive instrument such as a scintillation counter or in particular a magnetometer, must be free from vibration or oscillation, and be maintained in definite orientation with respect to the flight path of the towing aircraft. Such a vehicle should travel in a straight line or in a smoothly curved path, and should follow the towing aircraft smoothly through maneuvers.

In the past there have been numerous attempts to design air-towed instrument carrying vehicles that have desirable characteristics, but each known device has been subject to distinct limitations. For instance, one approach to the requirement for a satisfactory air-towed vehicle has been the use of a towed "bomb" arrangement wherein the instrument is housed in a streamlined body having small, fixed stabilizing fins attached to the after portion of the body. The "bomb" is suspended approximately at its center of gravity so that the stabilizing fins do not have to contribute continuous lift. The fins serve to maintain flight into the relative wind and to establish the aerodynamic center aft of the center of gravity of the bomb for stability purposes.

The towed bomb arrangement is characterized, however, by low static and dynamic stability with the consequence of having poor recovery to the original position from a rapid maneuver of the towing aircraft, or from disturbances caused by large gusts. A large overshoot, repeating for several cycles, will be observed for each disturbance of the vehicle from its heading.

A towed vehicle with improved stability can be made by moving the cable attachment point to the nose of the vehicle, and affixing larger horizontally disposed airfoils aft to carry the portion of the load no longer taken by the cable. While having improved general characteristics, especially with respect to directional stability and damping in roll, this configuration suffers from poor static stability in roll and larger reaction to gusts due to the sensitivity of the high lift airfoils to angle of attack. The presence of the airfoils causes this vehicle to perform poorly in disturbed air, particularly when it is being towed in comparatively close proximity to the towing aircraft. Propeller wash can readily produce overturning moments of this craft. This class of towed vehicle, in addition, is critical as to design parameters. It must be constructed to close tolerances to eliminate permanent rolling moments, and it has the desired flight characteristics only in a narrow speed range unless surfaces that are controllable in flight are employed on the vehicle. Furthermore, when required to operate at high towing speeds, an oscillatory vibration may be induced into the cable, for there is insufficient drag in this type of vehicle to provide the cable tension required at high speed in order to overcome cable vibration.

Another type of towed vehicle is of the drogue type which may consist of a cylindrical body with a stabilizing drag cone affixed to the after portion of the cylinder. While this type of craft is not subject to some of the foregoing disadvantages, it is a fact that any elongated body whose longitudinal axis is not parallel to the air stream and whose section along the air stream is not streamlined will cause turbulent disturbances to the air resulting in the formation of a "Von Karman Vortex Street," which consists of vortices which peel off alternately from each side of the vehicle. As a result of this effect, the vehicle just described, when inclined to the relative wind, receives a sidewise vibration or roll which can be very undesirable when certain types of instrumentation are to be carried.

An air-towed vehicle that will not be subject to any of the foregoing disadvantages must either have a streamlined section that in some manner is always maintained parallel to the line of travel, or else have a configuration that is characterized by no elongation, such as a sphere. According to the present invention, it has been found that the use of a spherically-shaped vehicle represents the most satisfactory solution to the problem.

A vehicle according to this invention is substantially spherical in shape and employs stabilizing fins to prevent the vehicle from rolling around the tow line and to prevent yaw of the vehicle. Since these fins are articulated on the horizontal axis passing through the center of gravity of the sphere, there can be no lift created. The restoring forces necessary to give the body stability in flight, therefore, are obtained without the use of lifting surfaces that are affixed firmly to the body. Because there are no lift surfaces on the instant vehicle, Dutch roll, i.e., a combination of pitch and yaw acting together, will not be present, as in the case with many vehicles that have firmly fixed airfoils or which are capable of developing lift forces as a result of the shape of the vehicle body. The drag of the spherical vehicle is sufficient that substantial cable tension is maintained at all times, thereby permitting the vehicle to be towed at high speed without cable vibration.

According to a preferred form of this invention, the towing cable extending rearwardly from the towing craft is attached at the end of a streamlined boom that extends outwardly from the surface of the instant air-towed vehicle. The distance between the point of cable attachment and the center of gravity of the vehicle (which also is center of drag) provides a moment arm that supplies the necessary restoring force for stability in pitch, and contributes jointly with the fins in supplying stability in yaw.

Since the stabilizing fins are rotatably mounted at the center of gravity of the vehicle (which is on the pitch axis), the fins may always be directed in line with the flight path so that they can continuously contribute restoring forces in roll and yaw. Such restoring forces are obtained regardless of changes in the pitch attitude of the vehicle due to the changes in angle of the towing cable with respect to the flight path, such as would be brought about by variations in the speed of the towing aircraft. Because the fins are so articulated and the vehicle is substantially spherically shaped, changes in the attitude of the body do not alter the aerodynamic forces acting thereupon. Instabilities on the pitch axis, which might be caused by changing aerodynamic forces on other vehicles are here eliminated.

A principal object of this invention is to provide an air-towed vehicle that will operate over a wide range of towing speeds, and that is stabilized so as to possess flight characteristics satisfactory for the carrying of sensitive instrumentation.

Another object of this invention is to provide an air-towed vehicle in which the restoring forces necessary for stability of the vehicle are obtained independent of fixed lifting surfaces, thereby eliminating Dutch roll tendencies.

Still another object is to provide an air-towed vehicle possessing sufficient drag as a result of its shape that freedom from cable vibration at higher speeds will be assured, and good position stability in flight achieved.

Yet another object of this invention is to provide aerodynamic stabilization of the towed vehicle in such a manner that the stabilizing fins of the vehicle are located in regions free of air turbulence, and therefore not influenced by turbulent or disturbed air created by motion of the vehicle body through the air stream.

A further object of this invention is to provide aerodynamic stabilization for a vehicle without it being necessary to use adjustments to eliminate rolling moments introduced by the aerodynamic surfaces.

A still further object of this invention is to provide a towed vehicle that is not affected in pitch by vertical air currents.

Other objects, features and advantages of this invention will be apparent from the following detailed description and the accompanying drawings in which:

Figure 1 is a side elevational view of the air-towed vehicle, with the stabilizing fins in the flight position;

Figure 2 is a plan view of the vehicle, illustrating in phantom the internal construction of the vehicle;

Figure 3 is a front elevational view illustrating fin details;

Figure 4 is an enlarged fragmentary view showing a dashpot in section, and details of the bearing means;

Figure 5 is a side elevational view showing the vehicle rolled somewhat about the tow line-boom axis; and Figure 6 is a plan view, illustrating the vehicle rolled about the tow line-boom axis in a similar manner to that shown in Figure 5.

Referring to the drawings, and particularly to Fig. 1, an air-towed vehicle 10 is shown, comprising a hollow body 11 that is generally spherical in shape, and in which detection instrumentation can be carried. The vehicle is particularly designed to be towed behind an aircraft such as by means of a cable 14. The towing cable can be attached directly to the outer surface of body 11, but it is preferable for stability reasons to employ an attachment means in the form of a boom of some length, rigidly mounted upon the body and extending outwardly therefrom. Accordingly, streamlined boom 12 is provided, the outer end 13 of which forms a cable attachment point and the interior of which may be used to house part of the instrumentation to be carried in the vehicle.

Fins or vanes 15 are provided for the stability of the instant vehicle. The primary function of the fins is to prevent the vehicle from rolling about the tow line, but they also serve to maintain stability about the yaw axis. The fins are mounted upon arms 15', which are rotatably mounted in polar located bearings that are equidistant from the boom 12. The fins are preferably arranged in the "butterfly" configuration shown in Fig. 3, for such an arrangement not only represents simplicity and effectiveness of aerodynamic design, but also keeps the fins out of the turbulent stream occurring directly behind the sphere as the sphere is towed through the air.

Because of the inherent drag of the vehicle, the cable 14 remains taut whenever the vehicle is being towed, and the boom 12 stays substantially in alignment with the cable. As will be discussed hereinafter at greater length, the boom 12 has the important function of developing restoring forces for keeping the vehicle stable about the pitch axis, and it also contributes jointly with the fins in maintaining stability about the yaw axis.

As the speed of the towing aircraft changes, the tow line-boom axis changes with respect to the direction of flight, thereby having the effect of changing the pitch attitude of body 11. Inasmuch as the fins 15 are rotatably mounted, they can lie correctly in the air stream regardless of the pitch attitude of body 11. This obviously has great advantages over an arrangement wherein the stabilizing fins are firmly and non-rotatably affixed to the towed vehicle, for the latter arrangement would inhibit changes in pitch attitude.

The arms 15' are located at diametrically opposite portions of body 11, and each arm is affixed to a short shaft 18. Each shaft in turn, is rotatably mounted in a bearing 17 maintained in position on the outer shell of the body 11, such as by means of a nut 21. A counterweight 16 is attached to the inner end of each shaft 18 to balance the weight of its respective fin 15 and arm 15'. Although the counterweights could be interconnected, they are preferably separate, and are shaped to clear the contained parts of the body. When the weights are separate it is possible for the fins to move relative to each other, thereby eliminating any tendency of the vehicle to roll in flight due to some misalignment of the fins. Thus, the fins are rotatable about the center of gravity of the body 11 with respect to the pitch axis, but are rigid about the yaw axis so as to be effective in creating great stability in roll and yaw.

A dashpot 19 is provided intermediate the ends of each shaft 18, the housing or stator portion of each dashpot being affixed to the body 11 such as by screws 22. The inner or rotor portion of each dashpot is affixed to its respective shaft 18 in the manner shown in Fig. 4, so as to be rotatable with the shaft. The housing of each dashpot is filled with oil or the like, so that each dashpot will act as a damper with respect to movements of the fins 15. The dashpots make it possible for the fins to move freely with respect to the body when the pitch attitude of the vehicle undergoes a comparatively slow change due to speed changes of the towing aircraft, but inasmuch as retarding forces are developed by the dashpots proportional to the speed of angle change between the fins and the vehicle proper, rapid angular movements between the fins and vehicle are prevented. Any rapid movement of the vehicle is transmitted directly to the fins, thus providing aerodynamic damping for the vehicle.

The vehicle according to this invention will trail the towing aircraft in straight line flight as well as in curvilinear flight. Position stability of the vehicle in flight with respect to the towing aircraft is aided by the moderate drag of the vehicle and the resulting substantial cable tension. The tension on the towing cable results in a reaction force lying in the direction of the cable which, reacting in combination with the weight and aerodynamic drag forces acting at the center of the body, represents a force system in equilibrium for locating a stable flight position for the vehicle. The forces in this system are relatively high due to the configuration of the body, thus establishing high static stability.

The moderately high aerodynamic drag of this vehicle also contributes to dynamic position stability (freedom from pendulum type motion) since this drag supplies the damping required to prevent continuous or large amplitude pendulum oscillations.

There are built-in restoring force to stabilize the attitude of the vehicle in flight. Restoring forces about the pitch and yaw axes are supplied as a result of the cable tension and the presence of boom 12, for inasmuch as the drag of the vehicle body causes the boom to remain in substantial alignment with the towline at all times, the distance between the point of cable attachment 13 and the center of gravity of the vehicle provides a moment arm that supplies a restoring force in these two directions.

As previously mentioned, the stabilizing fins 15 provide stability for the vehicle about the tow line-boom axis, which may properly be termed the roll axis of the vehicle. If, for instance, as a result of an aerodynamic disturbance, the vehicle were to roll about the tow line-boom axis in the manner indicated in Figs. 5 and 6, the center line of shafts 18 becomes skewed with respect to the normal position of this line, which, under non-roll circumstances is perpendicular to the relative wind and perpendicular to a plane containing the tow line and longitudinal axis of the boom. In other words, roll of the vehicle about the tow line-boom axis will necessarily cause the axis of articulation of the fins to deviate from the position of perpendicularity with respect to the relative wind and the fins themselves will be placed in a skewed attitude and compelled to assume an angle of attack to the relative wind. When the axis of rotation of the fins is in the skewed position as shown in Figs. 5 and 6, the fins are necessarily at an angle of attack, and aerodynamic forces are thereby developed which move the fins toward the position of alignment with the relative wind. According to the geometry of the vehicle, there is only one position of roll attitude about the tow line-boom axis which will allow the fins 15 to assume a zero angle of attack with respect to the relative wind, and this position is the normal position as shown in Fig. 1. Thus, restoring forces exist about the pinch, yaw and roll axes of the vehicle, and the vehicle is caused to assume a stable attitude in flight.

As previously mentioned, when using prior art devices even at low speeds, vibratory waves can travel down the towing cable, causing vibration of the instrument carried and introducing severe tension loads on the cable. This vibration is dependent upon the interrelation between the cable mass, cable tension and the speed of the air stream. An increase in cable tension will prevent this vibration from occurring over the speed range desirable for the towing of instrument carrying vehicles. This increase in cable tension is achieved by the present device as a result of its moderate drag, thus making possible higher towing speeds without cable vibration. As an example, a body 11 of approximately 30 inches in diameter will afford sufficient drag to eliminate cable vibration at speeds in the general vicinity of 280 knots.

With the use of this air-towed vehicle, scientific detection instrumentation can be carried very successfully. For instance, a magnetometer 23 or a scintillation counter can be carried in the central portion of the vehicle body, with the instrument thereby at the center of gravity of the body. By towing the vehicle containing a scintillation counter at a height of 35 feet to 55 feet above the ground a search for uranium can be conducted. This is by way of example only, for it should be obvious that any of a number of different instruments could be carried, and searches conducted over water as well as over land.

Various changes can be made in the details of construction without departing from the spirit of the invention or sacrificing any of the advantages thereof.

I claim:

1. A medium drag air-towed vehicle for carrying detection instrumentation or the like a substantial distance behind a towing aircraft comprising a substantially spherical vehicle body adapted to carry the instrumentation, a boom extending outwardly from the surface of the body to which a cable can be attached, said body, because of its drag, causing the towing cable to remain taut and thereby cause said boom to remain in substantial alignment with the cable, said boom thereby forming a moment arm that supplies the necessary restoring force for stability about the pitch and yaw axes and no-lift means disposed on the pitch axis of said body and arranged to lie so as to conform with the airstream when said body is in a normal position, but being forced out of conformance with the airstream upon said body tending to roll about said boom due to the pitch axis of said body being necessarily disposed at an angle with respect to the airstream, thereby to prevent roll of said vehicle body about said boom.

2. A stabilized, medium drag air-towed vehicle for carrying detection instrumentation or the like a substantial distance behind a towing aircraft comprising a substantially spherical vehicle body adapted to carry the instrumentation, a boom extending outwardly from the surface of the body and having a cable attachment point thereon, stabilizing fins rotatably mounted on said body so as to contribute no lift but to supply stability about the roll axis of the vehicle, and means for resisting relative motion between said fins and said body, said body, because of its drag, causing the towing cable to remain taut and thereby cause said boom to remain in substantial alignment with the cable, said boom thereby forming a moment arm that supplies the necessary restoring force for stability about the pitch axis, said fins and said boom acting jointly to supply stability about the yaw axes of the vehicle.

3. An air-towed vehicle for carrying detection instrumentation or the like a substantial distance behind a towing aircraft comprising a substantially spherical vehicle body for carrying the instrumentation, and a pair of stabilizing fins rotatably mounted on said body so as to contribute no lift, said fins being mounted on diametrically opposite portions of the body at approximately the center of gravity of the body, said fins being articulated for damped movements about the pitch axis of the body, whereby the vehicle can take on a new pitch attitude with changes in angle of the towing cable.

4. An air-towed vehicle for carrying detection instrumentation or the like a substantial distance behind a towing aircraft comprising a generally spherical vehicle body for carrying the instrumentation, a boom to supply pitch stability, extending outwardly from the surface of the body and having a cable attachment point at the outer end thereof, a pair of stabilizing fins rotatably mounted on said body so as to contribute no lift, said fins being mounted on diametrically opposite portions of the body at approximately the center of gravity of the body so as to prevent roll and yaw of the vehicle, and means to resist rapid movement of said fins with respect to said body, whereby the vehicle can have great stability in flight and yet be quite insensitive attitude-wise to gusts.

5. An air-towed vehicle for carrying detection instrumentation or the like a substantial distance behind a towing aircraft comprising a substantially spherical vehicle body for carrying said instrumentation, a boom to supply pitch stability extending outwardly from the surface of the body and having a cable attachment point thereon, and a pair of stabilizing fins rotatably mounted on said body so as to contribute no lift, said fins being mounted on diametrically opposite portions of the body so as to prevent roll and yaw of the vehicle, said mounting points being equidistant from the point of attachment of said boom on said body, said fins being articulated individually for controlled movements with respect to said body and arranged to lie so as to conform with the airstream when said body is in a normal position but being forced out of conformance with the airstream upon said body tending to roll about said boom due to the axis of said fins being necessarily disposed at an angle with respect to the airstream, thereby to prevent roll of said body about said boom, whereby the vehicle has great stability in flight.

6. The vehicle as described in claim 5 in which damping means are provided to prevent oscillation of said fins with respect to said body.

7. A stabilized, medium drag air-towed vehicle for carrying sensitive detection instrumentation or the like a substantial distance behind a towing vehicle comprising a substantially spherical vehicle body possessing aerodynamic drag and adapted to carry instrumentation therein, a boom extending outwardly from the surface of said body and having a towing cable attachment point thereon, stabilizing fins rotatably mounted on said body substantially perpendicularly to said boom and defining the pitch axis of said body, said axis also being perpendicular to the airstream when said vehicle is in a normal position, said boom functioning as a moment arm for supplying a restoring force, and therefore providing stability for said vehicle about said pitch axis, said fins being comparatively rigid about the yaw axis of said vehicle but by virtue of being rotatable about said pitch axis being free to lie so as to conform to the airstream flowing past said vehicle when it is being towed in its normal position, said fins being forced out of conformance with the airstream upon said vehicle tending to roll about said boom, thereby generating aerodynamic restoring forces tending to move said vehicle back into a position in which said pitch axis is again perpendicular to said airstream, whereby said vehicle possesses stable flight characteristics over a wide range of towing speeds as a result of its capability of conforming to attitude changes of said boom as flight speeds change, without sacrificing its roll and yaw stability.

8. A stabilized, medium drag air-towed vehicle for carrying detection instrumentation or the like a substantial distance behind a towing vehicle comprising a vehicle body of substantially spherical configuration and possessing aerodynamic drag, said body being adapted to carry instrumentation therein, a boom extending outwardly from the surface of said body and having a towing cable attachment point thereon, stabilizing fins rotatably mounted on said body substantially perpendicularly to said boom and defining the pitch axis of said body, said boom functioning as a moment arm for supplying a restoring force for providing stability about said pitch axis, and contributing jointly with said fins to stability in yaw, said fins presenting aerodynamic surfaces substantially perpendicular to said pitch axis, and because of being rotatably mounted upon said vehicle, being arranged to lie so as to conform to the line of flight of said vehicle, while consistently contributing restoring forces to said vehicle in roll and yaw but no-lift, said fins being forced out of conformance with the airstream upon said vehicle tending to roll about said boom, thereby generating an aerodynamic restoring force tending to move said vehicle back to a position in which said fins again conform to the airstream, whereby said vehicle possesses stable flight characteristics over a wide range of towing speeds as a result of the capability of said fins to rotate and thereby conform to attitude changes of said boom as flight speeds change, without sacrificing their contribution to roll and yaw stability.

9. The vehicle as defined in claim 8 in which said fins are individually mounted to allow for relative movement of one fin with respect to the other.

10. A stabilized air-towed vehicle adapted for carrying sensitive detection instrumentation or the like comprising a generally spherical shaped body having comparatively high drag, a cable attachment point upon said body to which a towing cable may be attached, stabilizing fin means rotatably mounted on opposite sides of said body approximately at the center thereof, with the axis of articulation of said fin means normally being perpendicular to a vertical plane passing through a towing cable affixed to said cable attachment point, said fin means being comparatively rigid about the yaw axis and having freedom only about said axis of articulation whereby they may lie so as to conform to the airstream flowing past said vehicle when it is in a normal position in which said axis is perpendicular to said plane, but upon said body tending to roll about the towing cable, said fin means providing stability by virtue of said fin means being forced out of conformance with said airstream due to the skewed position of said axis with respect to said plane, said fin means thereby generating aerodynamic forces tending to move said vehicle body back to its normal position in which said fin means again lie so as to conform with the air stream flowing past said body.

References Cited in the file of this patent

UNITED STATES PATENTS

| 2,124,867 | Akerman | July 26, 1938 |
| 2,484,159 | Flynn | Oct. 11, 1949 |
| 2,779,553 | Troxell | Jan. 29, 1957 |

FOREIGN PATENTS

| 618,977 | Great Britain | Mar. 2, 1949 |